US006682371B2

(12) United States Patent
Steinhauser

(10) Patent No.: US 6,682,371 B2
(45) Date of Patent: Jan. 27, 2004

(54) OUTBOARD MOTOR POSITION RESPONSIVE SYSTEM

(76) Inventor: Louis P. Steinhauser, 2448 Cripple Creek Dr., St. Louis, MO (US) 63129

( * ) Notice: Subject to any disclaimer, the term of this patent is extended or adjusted under 35 U.S.C. 154(b) by 0 days.

(21) Appl. No.: 09/899,722

(22) Filed: Jul. 5, 2001

(65) Prior Publication Data

US 2002/0006753 A1 Jan. 17, 2002

Related U.S. Application Data

(60) Provisional application No. 60/216,209, filed on Jul. 6, 2000.

(51) Int. Cl.[7] .............................................. B23H 21/38

(52) U.S. Cl. ...................... 440/1; 440/88 C; 440/88 M

(58) Field of Search ........................ 440/1, 88 M, 88 C

(56) References Cited

U.S. PATENT DOCUMENTS

| | | | | | |
|---|---|---|---|---|---|
| 3,136,287 | A | * | 6/1964 | North | 248/640 |
| 3,406,652 | A | * | 10/1968 | Mettetal, Jr. | 440/56 |
| 3,641,965 | A | | 2/1972 | Schmiedel | |
| 3,834,345 | A | | 9/1974 | Hager et al. | |
| 3,894,250 | A | | 7/1975 | Hager et al. | |
| 4,005,674 | A | | 2/1977 | Davis | |
| 4,205,300 | A | | 5/1980 | Ho et al. | |
| 4,278,854 | A | | 7/1981 | Krause | |
| 4,414,541 | A | | 11/1983 | Ho | |
| 4,459,115 | A | | 7/1984 | Ballard | |
| 4,536,755 | A | | 8/1985 | Holzgang et al. | |
| 4,565,010 | A | | 1/1986 | Herman | |
| 4,841,285 | A | | 6/1989 | Laut | |
| 4,842,559 | A | * | 6/1989 | Litjens et al. | 440/1 |
| 4,861,291 | A | * | 8/1989 | Koike | 440/1 |
| D316,528 | S | | 4/1991 | Wilson, Jr. | |
| 5,038,137 | A | | 8/1991 | Lloyd | |
| 5,459,447 | A | | 10/1995 | Snyder et al. | |
| 5,612,670 | A | | 3/1997 | Snyder et al. | |
| 5,760,696 | A | | 6/1998 | Sadri et al. | |

* cited by examiner

*Primary Examiner*—Sherman Basinger
(74) *Attorney, Agent, or Firm*—Harness, Dickey & Pierce, P.L.C.

(57) ABSTRACT

An outboard motor position responsive system is disclosed that warns and/or prevents a powerboat operator from engaging the ignition system of an outboard motor when the outboard motor is tilted up beyond a maximum safe tilt position. The system comprises an outboard motor position sensor that is in communication with an ignition switch, wherein the sensor activates an alarm and/or an ignition disabling switch when an operator attempts to engage the ignition system when the outboard motor is tilted up beyond the maximum safe tilt position. An interval-on relay is also provided that limits the amount of time that the alarm and/or the ignition disabling switch are activated. The interval-on relay further prevents against wave-induced alarms with certain types of outboard motor position sensors in accordance with the present invention. A device is also provided that is easily retrofittable with the existing ignition system of a powerboat.

42 Claims, 6 Drawing Sheets

OUTBOARD MOTOR POSITION RESPONSIVE SYSTEM

CROSS-REFERENCE TO RELATED APPLICATIONS

This application is based upon Provisional Patent Application, Ser. No. 60/216,209, entitled "Power Boat Motor Alarm and/or Disabling Device," filed Jul. 6, 2000, the contents of which are incorporated herein by reference in their entirety and continued preservation of which is requested.

FIELD OF THE INVENTION

The present invention relates generally to powerboat motors and more particularly to alarms and ignition disabling systems for powerboats that are responsive to the absolute tilt position of an outboard motor.

BACKGROUND OF THE INVENTION

Systems that provide position sensing and response capability when a predetermined position of an object occurs have been disclosed for a variety of applications such as vehicle theft prevention, medical patient monitoring, earthquake detection, and to a limited extent, marine motors. Position sensing is generally accomplished in the related art with mercury switches, transducers and comparator circuits, variable resistance devices, infrared detectors, and other electrical devices. When a threshold position or condition has been registered by the position sensor, the sensor transmits a signal to a response device such as an alarm to warn an operator of an undesirable position of the object.

Devices and methods for position sensing, or tilt indication, of outboard motors are numerous and well known in the art. The devices generally provide an indication as to the absolute position or trim of the outboard motor through a visible analog gauge, hereinafter referred to as a trim position indicator, mounted on the instrument panel of the helm. A variety of electrical sensors are provided in the related art to detect the trim position and to subsequently communicate the absolute position of the outboard motor to the trim position indicator.

One such trim position sensor is disclosed in U.S. Pat. No. 4,459,115 to Ballard, wherein an electrically conductive ball is employed that rides on individual electrical contacts to sense the position of the outboard motor. The position sensor of Ballard senses the position of the propeller with reference to the water line rather than relative to the transom. Additional trim position sensors are disclosed in U.S. Pat. No. 4,005,674 to Davis, wherein the position of electrical contacts are varied with successive pivoting of the outboard motor, and also in U.S. Pat. No. 3,641,965 to Schmiedel that employs a variable resistor with linear variable resistor cards to sense and indicate trim position. The related art trim position sensors, however, are limited to sensing the absolute position of the outboard motor and indicating such position on the trim position indicator.

The trim position sensors of the related art do not appear to communicate with the ignition system of a powerboat so as to produce an alarm or disabling signal if the outboard motor is in an undesirable tilt position. More specifically, the related art does not warn or prevent an operator from starting the outboard motor if the outboard unit is improperly trimmed out of the water. For example, if the outboard motor is trimmed too high out of the water such that the water pump intake on the outdrive unit is out of the water, the water pump is deprived of necessary lubrication and can subsequently overheat and eventually fail. Moreover, water pump failure can lead to overheating and failure of the entire outboard motor. Additionally, the exhaust that exits from the exhaust port of the outdrive unit becomes extremely loud, thereby disturbing the operator, the passengers, and fellow boaters.

Accordingly, there remains a need in the art for a system that can warn and/or prevent a powerboat operator from starting the outboard motor if the outboard motor is improperly tilted out of the water. The device should also be inexpensive and capable of being easily retrofitted into existing powerboat systems.

SUMMARY OF THE INVENTION

In one form, the present invention provides an outboard motor position responsive device to inhibit or prevent a powerboat operator from engaging the ignition system while the outboard motor remains improperly tilted out of the water, i.e. beyond a maximum safe tilt position. The position responsive device generally comprises an outboard motor position sensor that is in communication with an existing ignition system of a powerboat. The outboard motor position sensor sends a signal to an alarm and/or an ignition disabling switch when the outboard motor is tilted up beyond the maximum safe tilt position. Accordingly, the alarm warns the operator of the undesirable tilt position and the ignition disabling switch disengages the ignition system so that the outboard motor cannot be started. Further, either an alarm or ignition disabling may be employed, or both an alarm and ignition disabling may be employed by the outboard motor position responsive system of the present invention.

The outboard motor position sensor is preferably a voltage comparator circuit that is in communication with an existing trim position indicator of a powerboat. Existing trim gauges generally include a potentiometer mounted on the tilt axis of an outboard motor, thereby presenting a graphical reference of tilt position rather than specific voltage readings from the circuit. Similarly, the voltage comparator circuit of the present invention further comprises a potentiometer that is used to adjust a reference voltage that corresponds to the maximum safe tilt position of the outboard motor. When the reference voltage is approached, the voltage comparator circuit activates the alarm and/or the ignition disabling switch to warn the operator of the undesirable tilt position of the outboard motor.

In another form, the position responsive device further comprises an interval-on relay in communication with the outboard motor position sensor to activate the alarm or the ignition disabling switch for only a predetermined amount of time. Accordingly, the operator experiences the alarm and/or the ignition disabling switch as a warning only for a predetermined amount of time prior to starting the outboard engine. The operator may then engage the outboard motor and proceed at their own risk. The interval-on relay also prevents against wave-induced alarms or activation of the ignition disabling switch due to slight changes in voltage from the oscillatory or "bouncing" action of the powerboat traversing through the water.

In other forms, the outboard motor position sensor may comprise other devices that sense the tilt position of the outboard motor. Such devices may include, for example, a mechanical limit switch, a proximity switch, a mercury switch, an optical switch, or a water sensing device, among others, as described in greater detail below.

In one form, the alarm is an audible electric buzzer that is easily heard by the powerboat operator. In other forms, the alarm may comprise, for example, a light such as an LED (light emitting diode) mounted to the helm, or a computerized voice warning, among others. In addition to disabling the ignition system, responsive devices that initiate automatic lowering of the outboard motor to a proper tilt position prior to engaging the ignition system are also provided.

Communication amongst the outboard motor position sensor, the interval-on relay, the alarm, the ignition disabling switch, and other system components may be accomplished by conventional hard wiring, infrared (IR) signal transmission and reception, or radio frequency (RF) signal transmission and reception, among others. Further, signals may be superimposed over existing powerboat hard wiring to minimize the need for additional hard wire connections.

The present invention also provides a junction box that houses the components of the position responsive system, which is easily retrofittable with existing ignition systems of powerboats. The junction box is relatively small and further comprises adjustment screws that correspond with potentiometers that adjust the amount of time that the alarm and/or the ignition disabling switch remain activated and that adjust the reference voltage that corresponds with the maximum safe tilt position of the outboard motor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
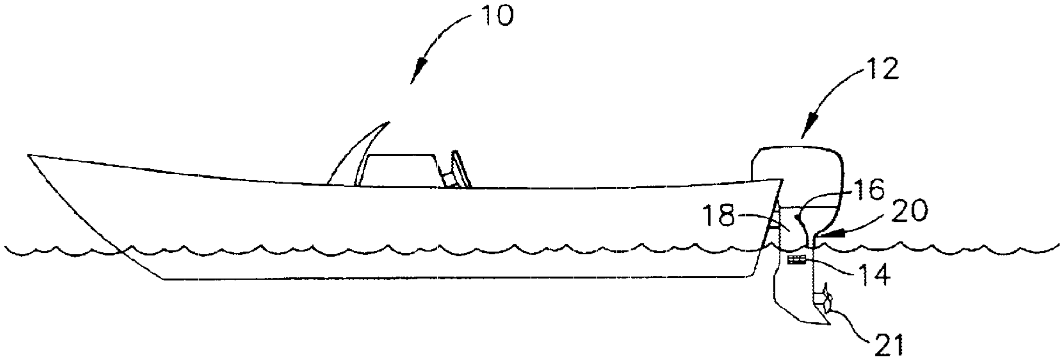
FIG. 1 is a side view of a powerboat in the water with an outboard motor properly trimmed for ignition in accordance with the present invention.
Figure 2:
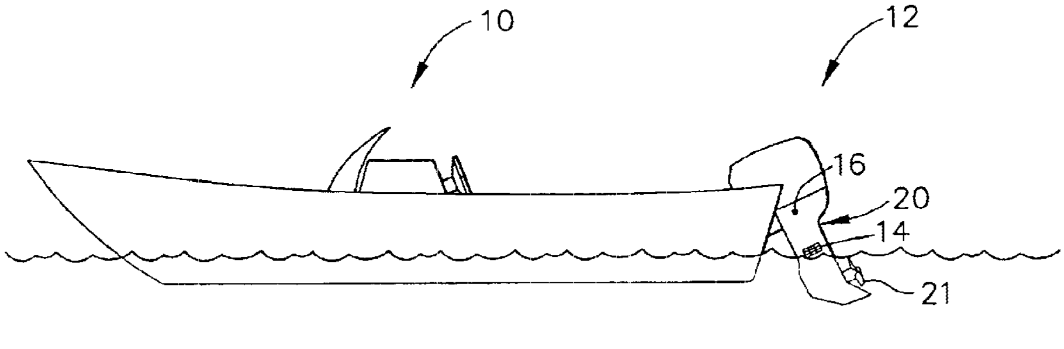
FIG. 2 is a side view of a powerboat in the water with an outboard motor tilted up beyond the maximum safe tilt position in accordance with the teachings of the present invention.

Referring to FIGS. 1 and 2, a typical powerboat 10 generally comprises an outboard motor 12 that is capable of being tilted throughout a range, which includes the general up and down positions as shown. As illustrated in FIG. 1, the outboard motor 12 is tilted down sufficiently such that a water pump intake 14 is submerged in the water and the outboard motor 12 is trimmed properly in the water for general operation. When the outboard motor 12 is tilted down to a proper tilt position, a water stream from a water pump outlet port 16 continuously flows from an outdrive unit 18, and the exhaust exits quietly from an exhaust port 20.

Referring to FIG. 2, outboard motor 12 may also be tilted out of the water under various conditions such that water pump intake 14 is completely out of the water. When the outboard motor 12 is tilted out of the water as shown in FIG. 2 while still running, the water stream from the water pump outlet port 16 stops and the exhaust becomes loud as it exits from the exhaust port 20 and the propeller 21. Furthermore, if an operator attempts to engage the ignition system when the outboard motor 12 is tilted up as shown in FIG. 2, wherein the water pump intake 14 is out of the water, the water pump is deprived of necessary lubrication and may subsequently overheat and eventually fail. Moreover, water pump failure may lead to overheating and failure of the outboard motor 12. Additionally, the exhaust from the propeller 21 becomes disturbingly loud, especially to fellow boaters. The tilt position of outboard motor 12 as shown in FIG. 2 is therefore an undesirable tilt position when the ignition system is engaged.

Figure 3:
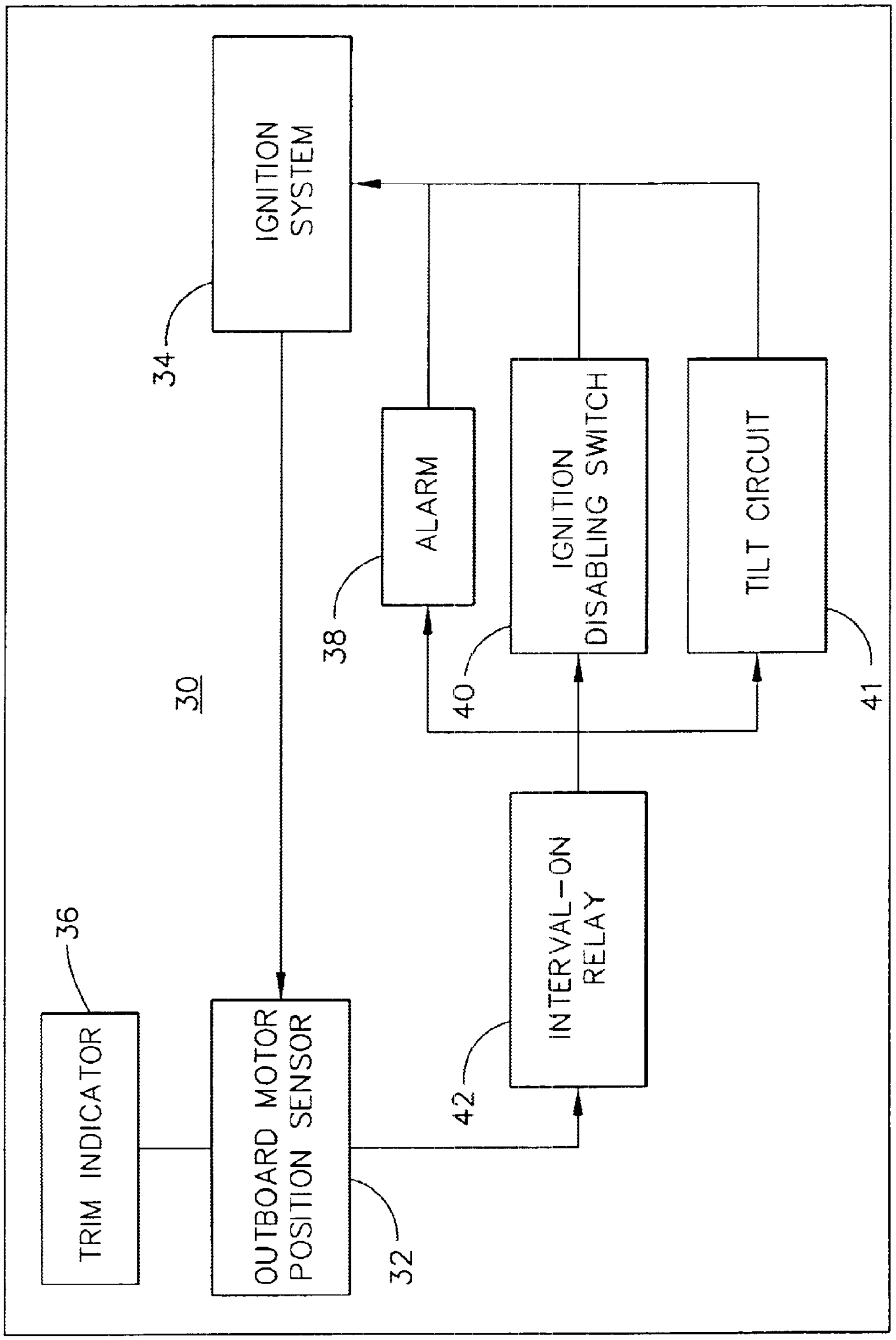
FIG. 3 is a block diagram of the position responsive system in accordance with the present invention.

Accordingly, a position responsive system that warns against and/or prevents undesirable outboard motor tilt positions is illustrated in block diagram format and generally indicated by reference numeral 30 in FIG. 3. The position responsive system 30 generally comprises an outboard motor position sensor 32 that senses the absolute position of the outboard motor, which is further in communication with the ignition system 34 of a powerboat. Generally, the outboard motor position sensor 32 senses the absolute position of the outboard motor, i.e. whether the outboard motor 12 is properly trimmed as shown in FIG. 1, or whether the outboard motor 12 is tilted up beyond a maximum safe tilt position as shown in FIG. 2.

If a user attempts to engage the ignition system 34 when the outboard motor 12 is tilted up beyond a maximum safe tilt position, the outboard motor position sensor 32 activates an alarm 38 that warns the operator that the outboard motor 12 is improperly trimmed. Additionally, an ignition disabling switch 40 is similarly activated to prevent the operator from engaging the ignition system 34 when the outboard motor 12 is improperly trimmed. Furthermore, either or both the alarm 38 and the ignition disabling switch 40 may be employed in the position responsive system 30 in accordance with the present invention, depending on the specific operator requirements.

Optionally, a tilt circuit 41 may be activated such that the outboard motor 12 is automatically lowered to a properly trimmed position prior to engaging the ignition system 34. Therefore, the position responsive system 30 warns against and/or prevents engaging the ignition system 34 using one or a combination of the alarm 38, the ignition disabling switch, and the tilt circuit 41 when the outboard motor 12 is improperly trimmed.

As further shown, the position responsive system 30 also comprises an interval-on relay 42 that that limits the amount of time that the alarm 38 and/or the ignition disabling switch 40 are activated. Accordingly, the position responsive system 30 may be designed to warn the operator or prevent ignition of the outboard motor 12 for a predetermined amount of time, and then allow the operator to start the outboard motor 12 at their own risk. As a result, the interval-on relay 42 bypasses the alarm 38 and/or the ignition disabling switch 40 after the predetermined amount of time for such an operating condition. Additionally, the interval-on relay 42 may be employed to prevent against wave-induced alarms and/or activation of the ignition disabling switch 40 with certain types of sensors used for the outboard motor position sensor 32 as described in greater detail below.

Preferably, the outboard motor position sensor 32 is a voltage comparator that is in communication with an existing trim position indicator 36 of a powerboat. Trim position indicator 36 is generally a voltage meter that detects the voltage at a potentiometer mounted on a tilt axis of the outboard motor 12. Further, the trim position indicator 36 displays a relative graphical reference of the tilt position of the outboard motor 12. Therefore, depending on the tilt position of the outboard motor 12, a different absolute voltage value is output to trim position indicator 36. More specifically, by providing communication between a voltage comparator and the trim position indicator 36, an absolute voltage value may be determined that corresponds with the maximum safe tilt position of the outboard motor 12. In principle, therefore, the voltage comparator compares the voltage detected by the trim position indicator 36 to a predetermined threshold value (reference voltage) that corresponds to the maximum safe tilt position of the outboard motor 12. Accordingly, the outboard motor position sensor 32 activates the alarm 38 and/or the ignition disabling switch 40 if the detected voltage approaches the predetermined threshold value.

In one form of the present invention, voltage values were recorded throughout the tilt range of a 90 horsepower outboard motor. The voltage values ranged linearly from approximately 11.91 volts in the fully tilted down position, to approximately 7.9 volts at the maximum safe tilt position, (wherein the water pump inlet 14 remained in the water), to approximately 6.9 volts in the fully tilted up position. Therefore, if the voltage value were to fall below the 7.9 volts, outboard motor position sensor 32 would activate the alarm 38 and/or the ignition disabling switch 40 to warn the operator of an undesirable tilt position of the outboard motor 12 prior to engaging the ignition system 34. Accordingly, 7.9 volts was set as the reference voltage.

Figure 4:
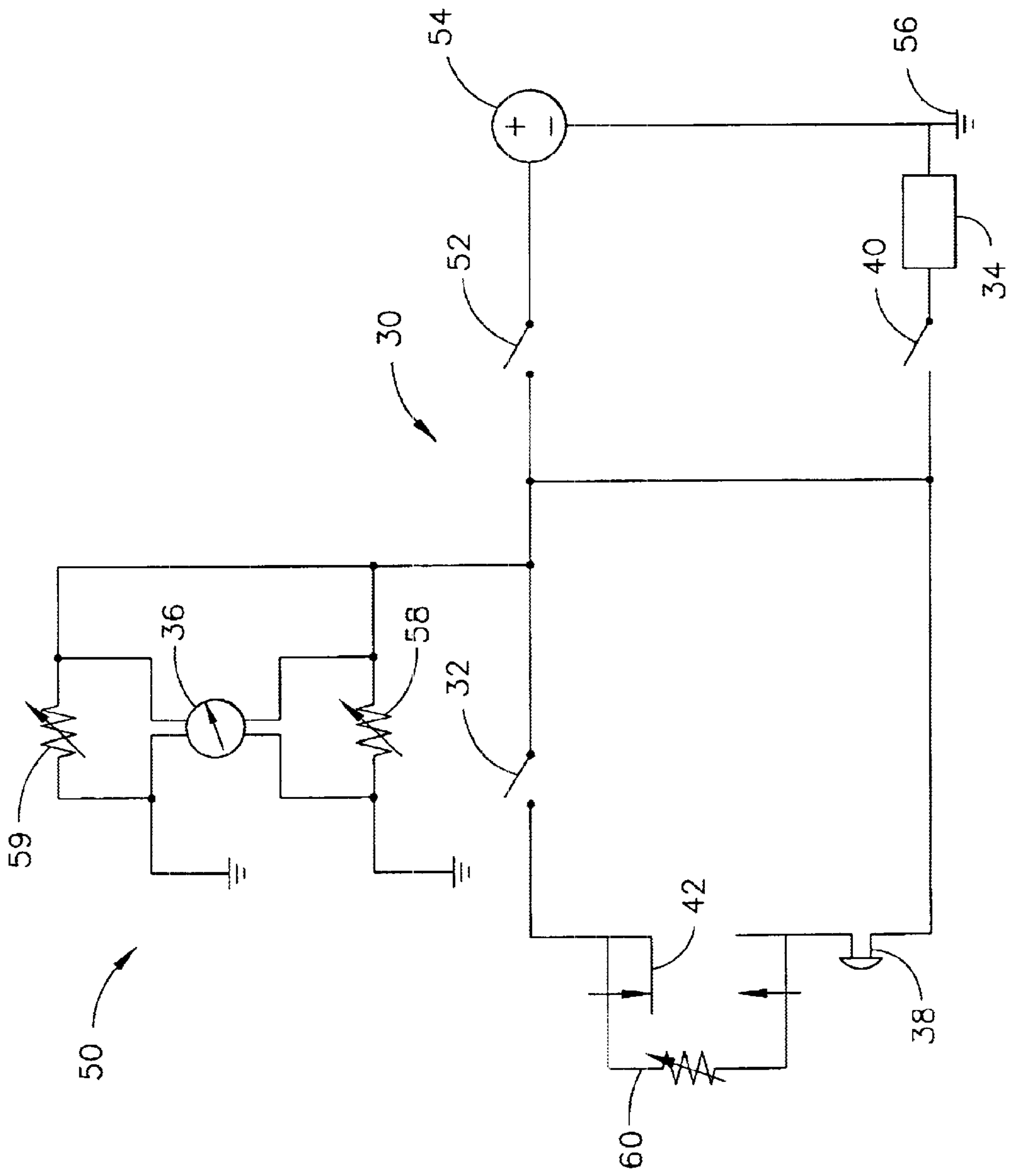
FIG. 4 is a conceptual electrical schematic of the position responsive system in accordance with the present invention.

Referring to FIG. 4, a conceptual electrical schematic for the position responsive system 30 is shown. The position responsive system 30 comprises a voltage comparator circuit 50 that is in communication with outboard motor position sensor 32, interval-on relay 42, the alarm 38, the ignition disabling switch 40, and an ignition switch 52. The ignition switch 52 is a part of the existing ignition system 34 of powerboats, and accordingly, the position responsive system 30 may be easily retrofitted therein for operation. Furthermore, the position responsive system 30 comprises a power source 54 and an electrical ground 56 to complete the electrical circuit as shown.

As shown, the voltage comparator circuit 50 further comprises a first potentiometer 58 and an existing trim gauge potentiometer 59. First potentiometer 58 is used to set the reference voltage in the voltage comparator circuit 50 that corresponds to the maximum safe tilt position of the outboard motor 12 as previously described. As further shown, the position responsive system 30 also comprises a second potentiometer 60 that is in communication with the interval-on relay 42. Generally, the second potentiometer 60 is used to set the predetermined amount of time that the alarm 38 and/or the ignition disabling switch 40 are activated.

The outboard motor position sensor 32, or the voltage comparator circuit 50 in the illustrated form, is normally open when the outboard motor 12 is in the properly tilted position. When the ignition switch 52 is closed as the operator starts the outboard motor 12, electrical current bypasses the alarm 28 and passes through the ignition disabling switch 40, which is normally closed, to permit starting of the outboard motor 12. If, however, the outboard motor 12 is tilted at or beyond the maximum safe tilt position when the operator closes the ignition switch 52, the outboard motor position sensor 32 is closed, thereby activating the alarm 38 and/or the ignition disabling switch 40 as electrical current flows from the ignition switch 52 through the outboard motor position sensor 32 and to the alarm 38 and the ignition disabling switch 40. Accordingly, the alarm 38 and/or the ignition disabling switch 40 warn the operator that the outboard motor 12 is improperly tilted out of the water and should be tilted down into the water prior to engaging the ignition system 34.

As further shown, the interval-on relay 42 is preferably located between the outboard motor position sensor 32 and the alarm 38. Accordingly, the interval-on relay 42 is closed when the power source 54 is applied and is subsequently open after the predetermined amount of time as previously described. Therefore, if the outboard motor 12 is improperly tilted out of the water when the ignition switch 52 is closed, the outboard motor position sensor 32 is closed, thereby permitting current to flow through the interval-on relay 42 to the alarm 38 and/or the ignition disabling switch 40. After the predetermined amount of time, the interval-on relay 42 is open and the alarm 38 and/or the ignition disabling switch 40 are then bypassed.

Figure 5:
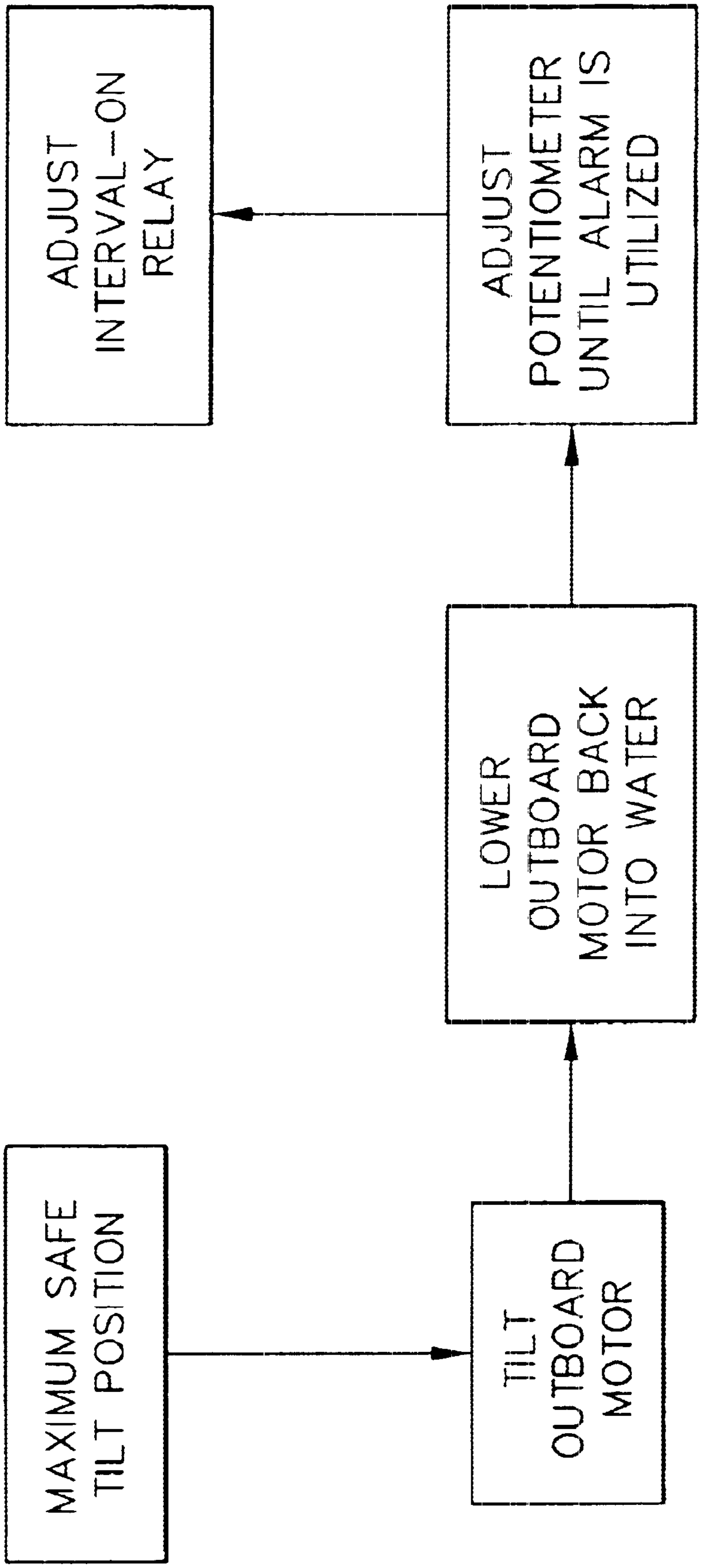
FIG. 5 is flow diagram illustrating a method of adjusting a reference voltage in accordance with the present invention.

In a preferred installation of the position responsive device 30 comprising a voltage comparator circuit 50, the voltage comparator circuit 50 is in communication with the trim position indicator 36, and the reference voltage is adjusted according to the following steps as shown in FIG. 5:

1) The outboard motor 12 is tilted up to the maximum safe tilt position while the powerboat 10 is in the water. The maximum safe tilt position is easily determined by tilting the outboard motor 12 until the exhaust from the exhaust port 20 becomes loud or when the water stream from the water pump outlet port 16 stops as previously described.
2) The outboard motor 12 is then tilted down to a position just below that which was determined in step number one.
3) The first potentiometer 58 is then adjusted until the alarm 38 activates either on or off.
4) The interval-on relay 42 is then adjusted for the desired amount of time that the alarm 38 and/or the ignition disabling switch 40 are to be activated.

As previously set forth, interval-on relay 42 is preferably employed to adjust the amount of time that the alarm 38 and/or the ignition disabling switch 40 are activated when an operator of the powerboat attempts to engage the ignition system 34 when the outboard engine 12 is tilted beyond the maximum safe tilt position. Additionally, the interval-on relay 42 is employed to prevent against false alarms or disabling of the ignition system 34 that may be induced by slight changes in voltage due to the oscillatory or "bouncing" action of the powerboat traversing through the water.

After the predetermined amount of time, the interval-on relay 42 is open and the alarm 38 and/or the ignition disabling switch 40 are bypassed. The predetermined amount of time in one form of the present invention is approximately five (5) seconds. After the predetermined amount of time, the interval-on relay 42 opens and is further reset in the closed position when the ignition switch 52 is opened.

Figure 6:
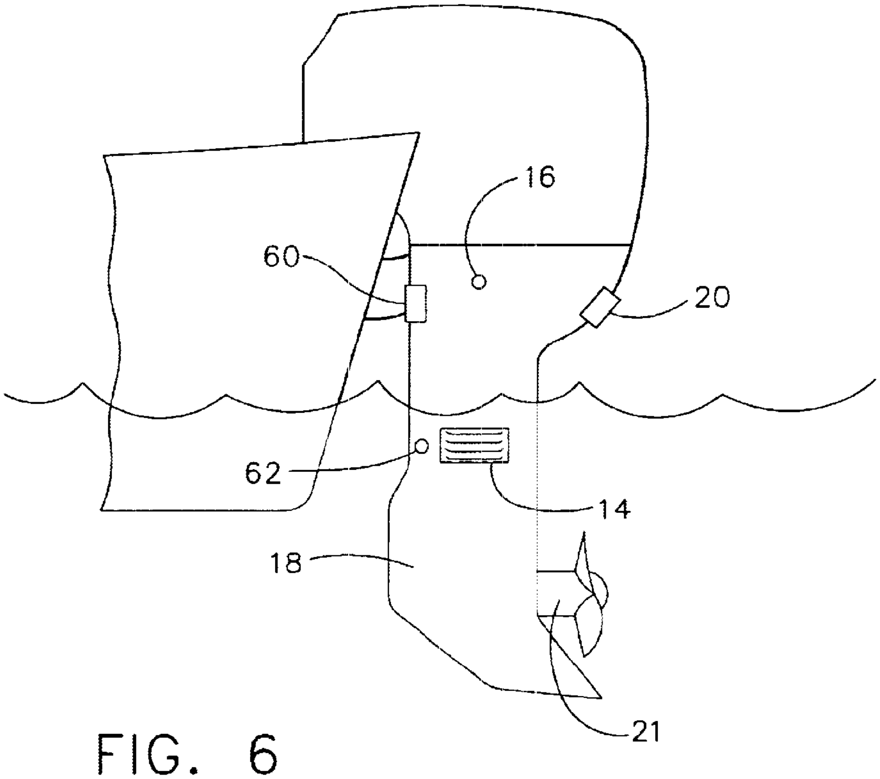
FIG. 6 is an enlarged side view of the outboard motor of FIG. 1 in accordance with the present invention.

In other forms, the voltage comparator circuit 50 may be replaced with another type of sensor such as a mechanical limit switch, a proximity switch, a mercury switch, or an optical switch that senses the position of outboard motor 12. As shown in FIG. 6, a mechanical, proximity, mercury, or optical switch may be located on the outboard motor 12 and also on an outboard motor mount 60. When the outboard motor 12 is properly tilted as shown, the mechanical, proximity, mercury, or optical switch is open, thereby bypassing the alarm 38 and/or the ignition disabling switch 40. Conversely, when the outboard motor 12 is tilted up beyond the maximum safe tilt position, the mechanical, proximity, mercury, or optical switch is closed, thereby activating the alarm 38 and/or the ignition disabling switch 40.

In yet another form, the voltage comparator circuit 50 is replaced with a water detector 62 as further shown. The water detector 62 detects the presence of water and therefore senses the maximum safe tilt position of outboard motor 12 according to the position of the water detector 62 on the outdrive unit 18. If no water is detected, the water detector 62 senses the maximum safe tilt position of the outboard motor 12 and activates the alarm 38 and/or the ignition disabling switch 40 accordingly. Conversely, if water is detected, the water detector 62 senses the properly tilted position of the outboard motor 12 and bypasses the alarm 38 and/or the ignition disabling switch 40. Additionally, the interval-on relay 42 may be employed to prevent against wave-induced alarms and/or activation of the ignition disabling switch 40 with the water detector since the outboard motor 12 is prone to oscillate or bounce as the powerboat traverses and impinges upon waves in the water. The oscillations or bouncing may intermittently expose the water detector 62 to air and water, thereby creating wave-induced alarms and/or activation of the ignition disabling switch 40.

In another form of the present invention, the output of the alarm 38 activates a tilt circuit 41 to automatically lower and properly tilt the outboard motor 12 when a position above the maximum safe tilt position is detected. Generally, tilt circuits are provided on most powerboats that raise the outboard motor 12, which are in electrical communication with existing power trim devices. Therefore, the position responsive system 30 may further be easily retrofitted with the electronic circuitry of existing outboard motor equipment.

Figure 7:
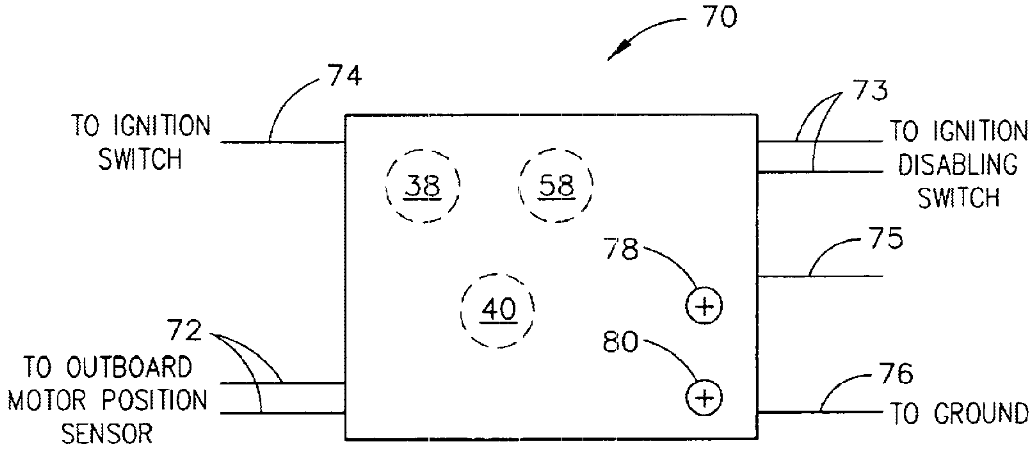
FIG. 7 is a top view of a junction box for integration of the position responsive system to an existing ignition system of a powerboat in accordance with the present invention.

Referring now to FIG. 7, a junction box 70 is shown that houses components of the position responsive system 30 and is easily retrofittable with existing ignition systems of powerboats. In one form, the junction box 70 is approximately 3"×4"×2" in size. The junction box 70 comprises two wires 72 that connect to the outboard motor position sensor 32, two wires 73 that connect to the ignition disabling switch 40, a fused wire 74 that connects to the ignition switch 34, an optional wire 75 that connects to the tilt circuit 41 to automatically lower and properly tilt the outboard motor 12, and a wire 76 that connects to the electrical ground 56. The junction box 70 further comprises a first adjustment screw 78 that is used to adjust the first potentiometer 58 to set the reference voltage for the maximum safe tilt position of the outboard motor 12. Additionally, a second adjustment screw 80 is provided that is used to adjust the second potentiometer 60 that sets the predetermined amount of time of interval-on relay 42 and hence the amount of time that the alarm 38 and/or the ignition disabling switch 40 are activated.

Figure 8:
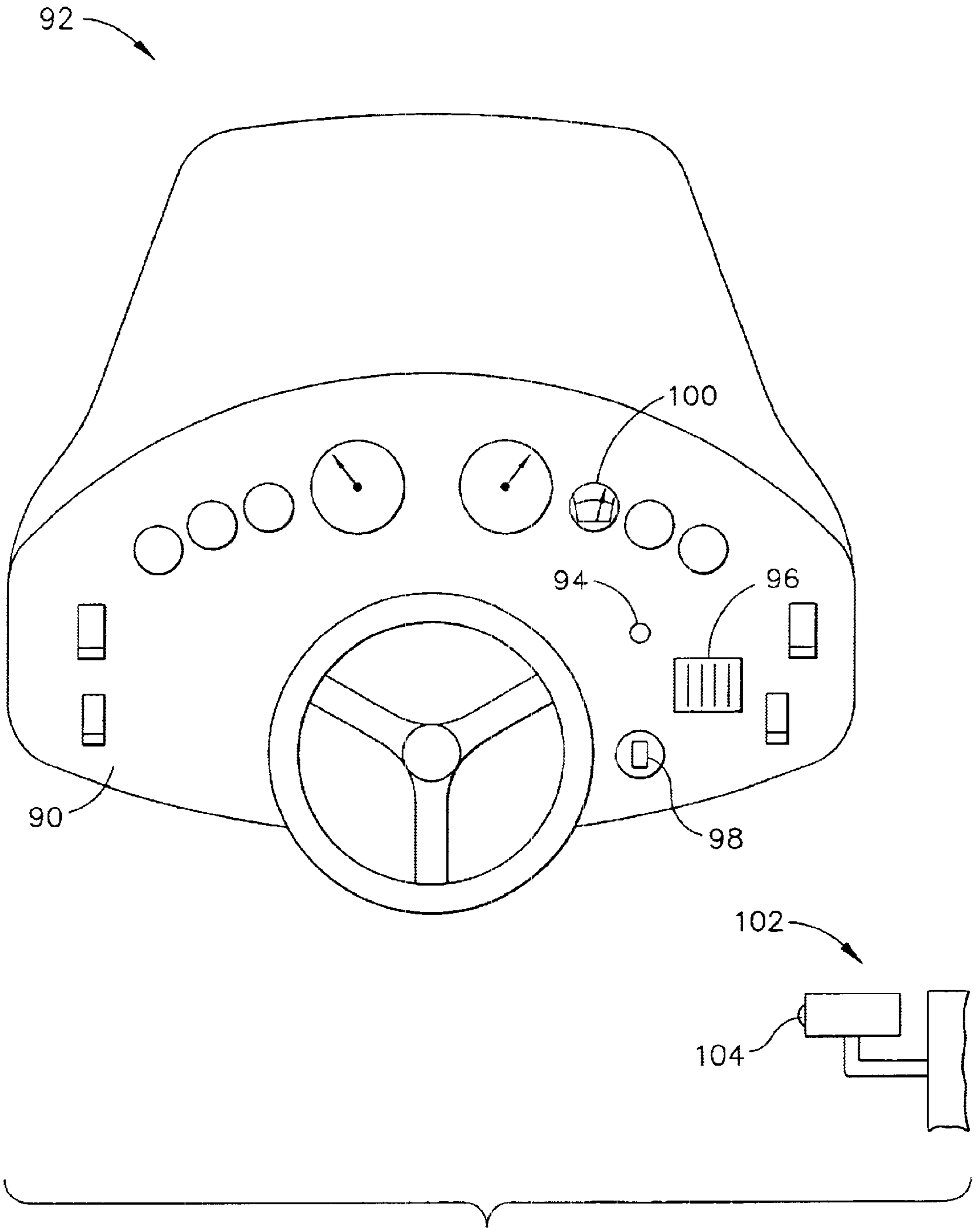
FIG. 8 is a front view of the helm of a powerboat illustrating the related instrumentation in accordance with the present invention.

The locations of various output devices of the present invention are illustrated in FIG. 8 on an instrument panel 90 of a helm 92. The output devices in one form comprise an LED alarm 94 and an audible alarm 96. Other devices that are shown for a supplemental understanding of the present invention comprise an ignition switch 98, a trim position indicator 100, a throttle 102, and a power trim 104. The output devices are shown in only few of many positions and configurations that may be possible depending upon the design characteristics of the helm 92 and the instrument panel 90.

Although the components of the present invention are in communication via conventional hard-wiring as described herein, other methods commonly known in the art such as infrared (IR) signal transmission and reception, or radio frequency (RF) signal transmission and reception, among others, may also be used while remaining within the scope of the present invention. Additionally, signals may be superimposed over existing powerboat hard wiring to minimize the need for additional hard wire connections.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An outboard motor position responsive system comprising:
  - an ignition system;
  - an outboard motor position sensor in communication with the ignition system, wherein the outboard motor position sensor is a voltage comparator in communication with a trim position indicator of a powerboat, wherein the voltage comparator compares a voltage detected by the trim position indicator to a predetermined threshold value and activates the alarm if the voltage detected by the trim position indicator approaches the predetermined threshold value:
  - an alarm in communication with the outboard motor position sensor; and
  - an interval-on relay in communication with the outboard motor position sensor, wherein the interval-on relay limits an amount of time that the alarm is activated,
  - wherein when an operator attempts to engage the ignition system when the outboard motor is tilted up beyond a maximum safe tilt position, the alarm is activated by the outboard motor position sensor to warn the operator.

2. An outboard motor position responsive system comprising:
  - an ignition system;
  - an outboard motor position sensor in communication with the ignition system, wherein the outboard motor position sensor is a water detector;
  - an alarm in communication with the outboard motor position sensor; and
  - an interval-on relay in communication with the outboard motor position sensor, wherein the interval-on relay limits an amount of time that the alarm is activated,
  - wherein when an operator attempts to engage the ignition system when the outboard motor is tilted up beyond a maximum safe tilt position, the alarm is activated by the outboard motor position sensor to warn the operator.

3. An outboard motor position responsive system comprising:

an ignition system;

an outboard motor position sensor in communication with the ignition system; and an alarm in communication with the outboard motor position sensor, wherein the communications are via infrared signals, wherein when an operator attempts to engage the ignition system when the outboard motor is tilted up beyond a maximum safe tilt position, the alarm is activated by the outboard motor position sensor to warn the operator.

4. An outboard motor position responsive system comprising:

an ignition system;

an outboard motor position sensor in communication with the ignition system; and an alarm in communication with the outboard motor position sensor, wherein the communications are via radio frequency signals, wherein when an operator attempts to engage the ignition system when the outboard motor is tilted up beyond a maximum safe tilt position, the alarm is activated by the outboard motor position sensor to warn the operator.

5. An outboard motor position responsive system comprising:

an ignition system;

an outboard motor position sensor in communication with the ignition system; and an alarm in communication with the outboard motor position sensor, wherein the communications are superimposed over existing wiring of a powerboat, wherein when an operator attempts to engage the ignition system when the outboard motor is tilted up beyond a maximum safe tilt position, the alarm is activated by the outboard motor position sensor to warn the operator.

6. An outboard motor position responsive system comprising:

an ignition system;

an outboard motor position sensor in communication with the ignition system, wherein the outboard motor position sensor is a voltage comparator in communication with a trim position indicator of a powerboat, wherein the voltage comparator compares a voltage detected by the trim position indicator to a predetermined threshold value and activates the ignition disabling switch if the voltage detected by the trim position indicator approaches the predetermined threshold value;

an ignition disabling switch in communication with the outboard motor position sensor; and an interval-on relay in communication with the outboard motor position sensor, wherein the interval-on relay limits an amount of time that the ignition disabling switch is activated, wherein when an operator attempts to engage the ignition system when the outboard motor is tilted up beyond a maximum safe tilt position, the ignition disabling switch is activated by the outboard motor position sensor to prevent the operator from engaging the ignition system.

7. An outboard motor position responsive system comprising:

an ignition system;

an outboard motor position sensor in communication with the ignition system, wherein the outboard motor position sensor is a water detector;

an ignition disabling switch in communication with the outboard motor position sensor; and an interval-on relay in communication with the outboard motor position sensor, wherein the interval-on relay limits an amount of time that the ignition disabling switch is activated, wherein when an operator attempts to engage the ignition system when the outboard motor is tilted up beyond a maximum safe tilt position, the ignition disabling switch is activated by the outboard motor position sensor to prevent the operator from engaging the ignition system.

8. An outboard motor position responsive system comprising:

an ignition system;

an outboard motor position sensor in communication with the ignition system; and an ignition disabling switch in communication with the outboard motor position sensor, wherein the communications are via infrared signals, wherein when an operator attempts to engage the ignition system when the outboard motor is tilted up beyond a maximum safe tilt position, the ignition disabling switch is activated by the outboard motor position sensor to prevent the operator from engaging the ignition system.

9. An outboard motor position responsive system comprising:

an ignition system;

an outboard motor position sensor in communication with the ignition system; and an ignition disabling switch in communication with the outboard motor position sensor, wherein the communications are via radio frequency signals, wherein when an operator attempts to engage the ignition system when the outboard motor is tilted up beyond a maximum safe tilt position, the ignition disabling switch is activated by the outboard motor position sensor to prevent the operator from engaging the ignition system.

10. An outboard motor position responsive system comprising:

an ignition system;

an outboard motor position sensor in communication with the ignition system; and an ignition disabling switch in communication with the outboard motor position sensor, wherein the communications are superimposed over existing wiring of a powerboat, wherein when an operator attempts to engage the ignition system when the outboard motor is tilted up beyond a maximum safe tilt position, the ignition disabling switch is activated by the outboard motor position sensor to prevent the operator from engaging the ignition system.

11. An outboard motor position responsive system comprising:

an ignition system;

an outboard motor position sensor in communication with the ignition system, wherein the outboard motor position sensor is a water detector, a tilt circuit in communication with the outboard motor position sensor; and an interval-on relay in communication with the outboard motor position sensor, wherein the interval-on relay prevents against wave-induced activation of the tilt circuit, wherein when an operator attempts to engage the ignition system when the outboard motor is tilted up beyond a maximum safe tilt position, the tilt circuit is activated by the outboard motor position sensor to automatically lower the outboard motor.

12. An outboard motor position responsive system comprising:

an ignition system;

an outboard motor position sensor in communication with the ignition system; and a tilt circuit in communication with the outboard motor position sensor, wherein the communications are via infrared signals, wherein when an operator attempts to engage the ignition system when the outboard motor is tilted up beyond a maximum safe tilt position, the tilt circuit is activated by the outboard motor position sensor to automatically lower the outboard motor.

13. An outboard motor position responsive system comprising:

an ignition system;

an outboard motor position sensor in communication with the ignition system; and a tilt circuit in communication with the outboard motor position sensor, wherein the communications are via radio frequency signals, wherein when an operator attempts to engage the ignition system when the outboard motor is tilted up beyond a maximum safe tilt position, the tilt circuit is activated by the outboard motor position sensor to automatically lower the outboard motor.

14. An outboard motor position responsive system comprising:

an ignition system;

an outboard motor position sensor in communication with the ignition system; and a tilt circuit in communication with the outboard motor position sensor, wherein the communications are superimposed over existing wiring of a powerboat, wherein when an operator attempts to engage the ignition system when the outboard motor is tilted up beyond a maximum safe tilt position, the tilt circuit is activated by the outboard motor position sensor to automatically lower the outboard motor.

15. An outboard motor position responsive system comprising:

an ignition system;

an outboard motor position sensor in communication with the ignition system, wherein the outboard motor position sensor is a voltage comparator in communication with a trim position indicator of a powerboat, wherein the voltage comparator compares a voltage detected by the trim position indicator to a predetermined threshold value and activates the alarm if the voltage detected by the trim position indicator approaches the predetermined threshold value;

an alarm in communication with the outboard motor position sensor;

an ignition disabling switch in communication with the outboard motor position sensor; and an interval-on relay in communication with the outboard motor position sensor, wherein the interval-on relay limits an amount of time that the alarm and the ignition disabling switch are activated, wherein when an operator attempts to engage the ignition system when the outboard motor is tilted up beyond a maximum safe tilt position, the alarm is activated by the outboard motor position sensor to warn the operator and the ignition disabling switch is activated by the outboard motor position sensor to prevent the operator from engaging the ignition system.

16. An outboard motor position responsive system comprising:

an ignition system;

an outboard motor position sensor in communication with the ignition system,;

an alarm in communication with the outboard motor position sensor;

an ignition disabling switch in communication with the outboard motor position sensor; and an interval-on relay in communication with the outboard motor position sensor, wherein the interval-on relay limits an amount of time that the alarm and the ignition disabling switch are activated, wherein when an operator attempts to engage the ignition system when the outboard motor is tilted up beyond a maximum safe tilt position, the alarm is activated by the outboard motor position sensor to warn the operator and the ignition disabling switch is activated by the outboard motor position sensor to prevent the operator from engaging the ignition system.

17. An outboard motor position responsive system comprising:

an ignition system;

an outboard motor position sensor in communication with the ignition system;

an alarm in communication with the outboard motor position sensor; and an ignition disabling switch in communication with the outboard motor position sensor, wherein the communications are via infrared signals, wherein when an operator attempts to engage the ignition system when the outboard motor is tilted up beyond a maximum safe tilt position, the alarm is activated by the outboard motor position sensor to warn the operator and the ignition disabling switch is activated by the outboard motor position sensor to prevent the operator from engaging the ignition system.

18. An outboard motor position responsive system comprising:

an ignition system;

an outboard motor position sensor in communication with the ignition system;

an alarm in communication with the outboard motor position sensor; and an ignition disabling switch in communication with the outboard motor position sensor, wherein the communications are via radio frequency signals, wherein when an operator attempts to engage the ignition system when the outboard motor is tilted up beyond a maximum safe tilt position, the alarm is activated by the outboard motor position sensor to warn the operator and the ignition disabling switch is activated by the outboard motor position sensor to prevent the operator from engaging the ignition system.

19. An outboard motor position responsive system comprising:

an ignition system;

an outboard motor position sensor in communication with the ignition system;

an alarm in communication with the outboard motor position sensor; and an ignition disabling switch in communication with the outboard motor position sensor, wherein the communications are superimposed over existing wiring of a powerboat, wherein when an operator attempts to engage the ignition system when the outboard motor is tilted up beyond a maximum safe tilt position, the alarm is activated by the outboard motor position sensor to warn the operator and the ignition disabling switch is activated by the outboard motor position sensor to prevent the operator from engaging the ignition system.

20. An outboard motor position responsive device comprising:

an outboard motor position sensor;

an alarm in communication with the outboard motor position sensor; and a junction box that is adapted for communication with an ignition system of the powerboat, wherein the alarm is disposed within the junction box, wherein when an operator attempts to engage an outboard motor when the outboard motor is tilted up beyond a maximum safe tilt position, the alarm is activated by the outboard motor position sensor to warn the operator.

21. The device of claim 20, wherein the outboard motor position sensor is a voltage comparator in communication with a trim position indicator of a powerboat, wherein the voltage comparator compares a voltage detected by the trim position indicator to a predetermined threshold value and activates the alarm if the voltage detected by the trim position indicator approaches the predetermined threshold value.

22. The device of claim 21 further comprising:

a first potentiometer in communication with the voltage comparator, wherein the first potentiometer is disposed within the junction box and is used to set the predetermined threshold value.

23. The device of claim 22 further comprising:

a first adjustment screw mounted to the junction box and in communication with the first potentiometer to adjust the predetermined threshold value.

24. The device of claim 20 further comprising:

an interval-on relay in communication with the outboard motor position sensor, wherein the interval-on relay limits an amount of time that the alarm is activated.

25. The device of claim 24 further comprising:

a second potentiometer in communication with the interval-on relay, wherein the second potentiometer adjusts the amount of time that the alarm is activated.

26. The device of claim 25 further comprising:

a second adjustment screw mounted to the junction box and in communication with the second potentiometer to adjust the amount of time that the alarm is activated.

27. An outboard motor position responsive device comprising:

an outboard motor position sensor;

an ignition disabling switch in communication with the outboard motor position sensor; and a junction box that is adapted for communication with an ignition system of the powerboat, wherein the ignition disabling switch is disposed within the junction box, wherein when an operator attempts to engage an outboard motor when the outboard motor is tilted up beyond a maximum safe tilt position, the ignition disabling switch is activated by the outboard motor position sensor to prevent the operator from engaging the outboard motor.

28. The device of claim 27, wherein the outboard motor position sensor is a voltage comparator in communication with a trim position indicator of a powerboat, wherein the voltage comparator compares a voltage detected by the trim position indicator to a predetermined threshold value and activates the ignition disabling switch if the voltage detected by the trim position indicator approaches the predetermined threshold value.

29. The device of claim 28 further comprising:

a first potentiometer in communication with the voltage comparator, wherein the first potentiometer is disposed within the junction box and is used to set the predetermined threshold value.

30. The device of claim 29 further comprising:

a first adjustment screw mounted to the junction box and in communication with the first potentiometer to adjust the predetermined threshold value.

31. The device of claim 27 further comprising:

an interval-on relay in communication with the outboard motor position sensor, wherein the interval-on relay limits an amount of time that the ignition disabling switch is activated.

32. The device of claim 31 further comprising:

a second potentiometer in communication with the interval-on relay, wherein the second potentiometer adjusts the amount of time that the ignition disabling switch is activated.

33. The device of claim 32 further comprising:

a second adjustment screw mounted to the junction box and in communication with the second potentiometer to adjust the amount of time that the ignition disabling switch is activated.

34. An outboard motor position responsive device comprising:

an outboard motor position sensor;

an alarm in communication with the outboard motor position sensor;

an ignition disabling switch in communication with the outboard motor position sensor; and a junction box that is adapted for communication with an ignition system of the powerboat, wherein the alarm and the ignition disabling switch are disposed within the junction box, wherein when an operator attempts to engage an outboard motor when the outboard motor is tilted up beyond a maximum safe tilt position, the alarm is activated by the outboard motor position sensor to warn the operator and the ignition disabling switch is activated by the outboard motor position sensor to prevent the operator from engaging the outboard motor.

35. The device of claim 34, wherein the outboard motor position sensor is a voltage comparator in communication with a trim position indicator of a powerboat, wherein the voltage comparator compares a voltage detected by the trim position indicator to a predetermined threshold value and activates the alarm and the ignition disabling switch if the voltage detected by the trim position indicator approaches the predetermined threshold value.

36. The device of claim 35 further comprising:

a first potentiometer in communication with the voltage comparator, wherein the first potentiometer is disposed within the junction box and is used to set the predetermined threshold value.

37. The device of claim 36 further comprising:

a first adjustment screw mounted to the junction box and in communication with the first potentiometer to adjust the predetermined threshold value.

38. The device of claim 34 further comprising:

an interval-on relay in communication with the outboard motor position sensor, wherein the interval-on relay limits an amount of time that the alarm and the ignition disabling switch are activated.

39. The device of claim 38 further comprising:

a second potentiometer in communication with the interval-on relay, wherein the second potentiometer adjusts the amount of time that the alarm and the ignition disabling switch are activated.

40. The device of claim 39 further comprising:

a second adjustment screw mounted to the junction box and in communication with the second potentiometer to adjust the amount of time that the alarm and the ignition disabling switch are activated.

41. A method of setting a reference voltage that corresponds with a maximum safe tilt position of an outboard motor in an outboard motor position responsive system, the method comprising the steps of:

(a) tilting the outboard motor until a water stream from a water pump outlet port of the outboard motor stops;

(b) lowering the outboard motor back into the water to a position slightly below the position of step (a); and (c) adjusting a potentiometer until an alarm is activated or deactivated.

42. The method of claim 41 further comprising the step of adjusting an interval-on relay to limit an amount of time that the alarm is activated.

* * * * *